United States Patent

Ney et al.

[11] Patent Number: 5,513,530
[45] Date of Patent: May 7, 1996

[54] SHADED ROTOR UNIVERSAL PARTICLE PRESSURE INTEGRATOR DEVICE

[76] Inventors: Robert J. Ney; R. Douglas Ney, both of 4215 E. Bay Dr. Ste. #1103B, Clearwater, Fla. 34624

[21] Appl. No.: 169,186

[22] Filed: Dec. 20, 1993

[51] Int. Cl.$^6$ ............................................. G01M 1/12
[52] U.S. Cl. ................................................ 73/382 R
[58] Field of Search ............................. 73/382 R, 383, 73/382 G

[56] References Cited

U.S. PATENT DOCUMENTS

| | | | |
|---|---|---|---|
| 3,114,264 | 12/1963 | Williamson | 73/382 G |
| 3,245,263 | 4/1966 | Cornelison | 73/383 |
| 3,315,526 | 4/1967 | Schulze | 73/383 |
| 3,722,286 | 3/1973 | Weber | 73/382 G |

Primary Examiner—Hezron E. Williams
Assistant Examiner—Helen C. Kwok

[57] ABSTRACT

A device is proposed to detect the existence of a hypothetical Universal Particle Field of the Universe. According to this hypothesis, this energy field is responsible for all gravitational, and inertial phenomena in the Universe. The proposed device is quite simple, and it is quite practical to build. This device may also settle the controversy between the advocates of the hypothetical "Field Generated By Matter" vs. the "Universal Particle Field" advocates. The device consists of a rotor, surrounded by a relatively large Universal Particle shading mass. A mass free slot, in line with a segment of the rotor rim mass, allows slightly less attenuated Universal Particle beams, than 180 degrees from this slot, to impinge on the rotor rim segment mass. Calculations given, indicate that a 10 kg rotor rim segment mass, with a 100,000 kg removed mass from the slot, results in a force on the rotor rim of about $6.67 \times 10^{-5}$ Newtons. Magnetically levitated bearings should allow a 1 meter diameter rotor to rotate at this torque.

1 Claim, 4 Drawing Sheets

SHADED ROTOR UNIVERSAL PARTICLE PRESSURE INTEGRATOR DEVICE

BACKGROUND OF THE INVENTION

Sir Isaac Newton published the "Laws of Gravitation" in 1687. The Universal Gravitational Constant "G" was measured by Sir Henry Cavendish in 1798, with a Coulomb torsional pendulum. Albert Michelson invented the Optical Interferometer and with it measured the speed of light to great accuracy, in 1887; this instrument was used in the famous Michelson Morley Experiments. These experiments conclusively proved the long held Stationary Ether Theory of the Universe to be invalid. Albert Einstein then stated mathematically his Theory of Relativity, relating the gravitational phenomena to the "space time continuum".

There is a lesser known theory, the Universal Particle Field (UPF) Theory, attempting to present a physical model for the gravitational and electro-magnetic phenomena. The attempt to prove or disprove this theory, is the purpose of the herein proposed device.

There are two schools of thought in this field, one believes that there is a "field" in the Universe that causes gravitation, the other believes that the gravitational forces emanate from the masses themselves. The proposed experiment may also shed light on this controversy.

BRIEF DESCRIPTION

In order to understand the proposed device, one must first be acquainted with the Universal Particle Field Theory. According to this theory, the Universe is saturated with sub-atomic particles moving at random with the speed of light, in every direction (FIG. 1), except near Black Holes. This has a great deal of similarity to the behavior of gases in a semi-infinite volume: such as particle mass and velocity, particle density per unit volume, pressure, elastic collisions between particles, and mean free path between collisions. Since there is an equal and oppositely directed particle, for every particle, one can consider the field to be made up of opposing particle pairs (FIG. 2). The Universal Particle (UP) beam, traversing a mass, is reduced in density by collisions within the atomic structure of said mass, and it is imparting the force of impact upon said mass.

Considering gravitational attraction between two masses, the only UP beams that cause gravitational attraction, are those that traverse both masses, henceforth called "significant" UP beams. The significant UP field between two spheres, is shown schematically in FIG. 3. In effect, the masses appear to focus the significant attenuated UP beams on each other. For approximate calculations, the centers of gravities can be considered as focal points of the significant UP beams. The projected area of a solid angle is proportional to the square of the distance from the focal point, hence the inverse square relationship of the centers of gravity spacing, in Newton's Equation of the Gravitational Force. The two masses $m_1$ and $m_2$ in this equation, determine the UP attenuation parameters, respectively.

The device proposed to test the UPF Theory, is based on a Shaded Rotor UP Pressure Integrator (FIG.'s 4 & 5). A relatively large shading mass surrounds a rotor, supported on low friction magnetic bearings. A narrow slot in the shading mass, is in line with a segment of the rotor rim mass. Since there is a "phantom" mirror image mass at 180 degrees from said slot, equal in mass to the mass removed from slot 3, the rotor rim mass is shaded more on the side opposite from the slot. And since most other UP beams, traversing the rotor rim mass, have equal and opposite counterparts, there should be a net force on the rotor. Calculations indicate that a slot of removed mass of 100,000 kilograms, should impart on a 10 kilogram rotor rim segment, a force of about equal to that produced by a 6.8 milligram weight on Earth.

There are significant UP beams that partially traverse slot 3, and impart forward and reverse torques on rotor 1. It is shown by Finite Element Analysis (FIG.'s 6, 7, & 8), that the forward components are larger; hence the above force calculations are conservative.

DETAILED DESCRIPTION

Figure 1:
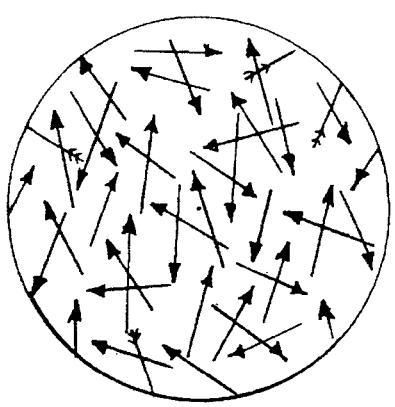
FIG. 1 is a schematic diagram of the Universal Particle Field.
Figure 2:
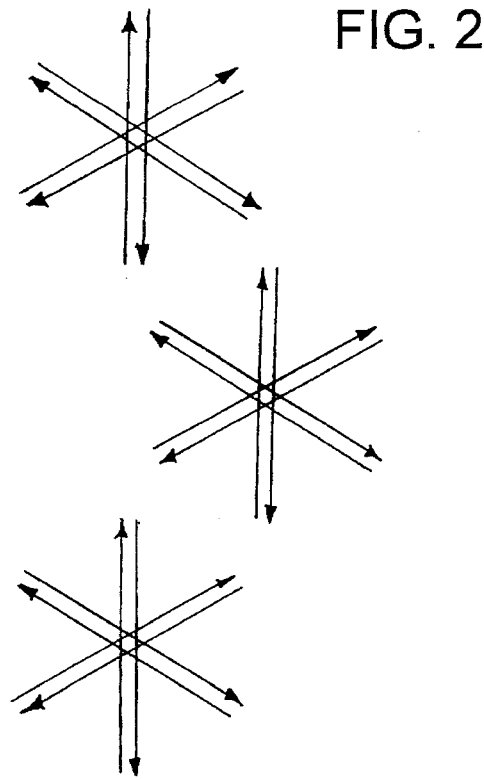
FIG. 2 is a schematic diagram of the Universal Particle pair concept.
Figure 3:
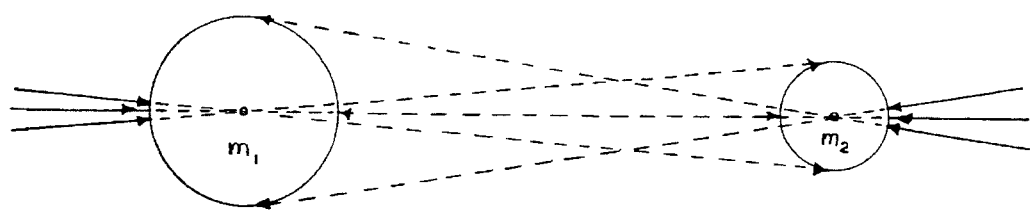
FIG. 3 is a schematic diagram of the Significant Universal Particle Field between two spherical masses.

The proposed device comprises rotor 1, surrounded by shade mass 2, with slot 3, in line with rim 4 of rotor 1. Said rotor is supported by low friction magnetic levitating bearings 5, which bearings are guided by polished steel pin 6, and teflon bushing 7. Most of the mass of rotor 1 is in rim 4, which is supported by spokes 8. The UP beam traversing slot 3, reaches the rotor rim 4 without attenuation in said slot, while the UP beam at 180 degrees from slot 3, is slightly attenuated by "phantom" mass 10. Only those UP beams that traverse totally or partially in slot 3, can have unbalanced or resultant net forces on rotor rim 4. All other UP beams traversing the above configuration, have equal and opposite counterparts, hence no net forces will be imparted by them upon rotor rim 4. Rotor 1 is made of non-magnetic materials.

To calculate the force imparted on rotor 1, by the imbalance produced by the above shade mass 2, Newton's Gravitational Force Equation is used:

$$F = G\, m_1 m_2 / d^2$$

where F is force in Newtons, in the MKS System.

G is the Universal Gravitational constant; $G = 6.67 \times 10^{-11}$ Newton meter$^2$/kg$^2$ $m_1$ and $m_2$ are (point) masses in kg, they are UP beam attenuation terms. d is the distance between centers of gravities of the masses in meters, The $1/d^2$ is a solid angle beam density attenuation from focal point term. It is a specific coupling coefficient between spherical masses. A more generalized coupling coefficient C may be designated.

One must understand that Newton's Gravitational Force Equation, is absolutely correct only if the masses are point masses. It is only approximately correct for "real" masses using centers of gravity spacings for d. The approximation gets better as d is increasing relative to the major dimensions of the masses. Only element by element summation of the forces, will give nearly correct total force of attraction, as the number of elements are approaching infinity.

The resultant force on rotor rim 4, is approximated by Finite Element Analysis, the outline of the analysis is indicated on FIG.'s 6, 7, & 8. To minimize confusion, only the "significant" UP beams are indicated. These are UP beams that traverse slot 3, totally or partially; each arrow represents a 5 degree solid angle of Universal Particle beams.

The magnitude of the vector force causing a torque on rotor rim segment mass 9, due to the UP beams traversing slot 3, is calculated by using the mass of the material removed to form slot 3, and the mass of rotor rim segment mass 9, in Newton's Gravitational Force Equation. In conventional thinking rotor rim segment mass 9, is attracted by phantom mass 10, 180 degrees from slot 3. Thus, the vector force, with $d=1$, $m_1=10$ kg, $m_2=100,000$ kg=100 metric tons is:

$$F=G(m_1 m_2)=6.67\times 10^{-11}\times(10\times 100,000)=6.67\times 10^{-5} \text{ Newtons}$$

This force is about equal to a force produced by a mass, on the Earth's surface, of $m=F/g=6.67\times 10^{-5}/9.8=6.8\times 10^{-6}$ kg=6.8 milligrams To significantly increase the net force on the rotor, to increase speed of response, and to conserve real estate, multiple slots may be utilized. The counter force would increase only slightly, for a well designed configuration.

Figure 6:
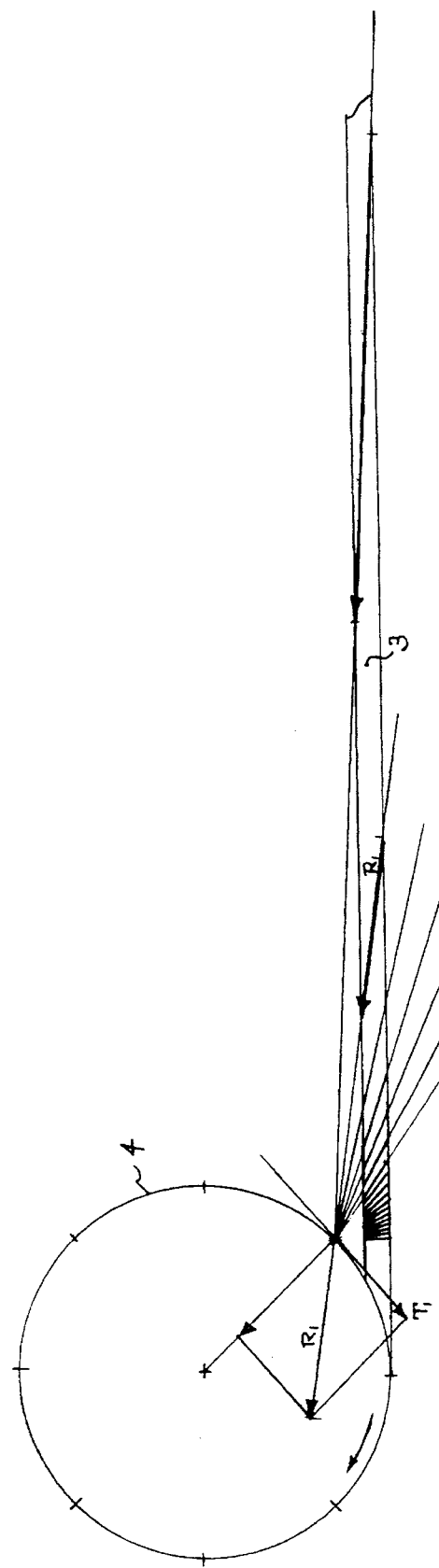
FIG. 6, 7, & 8 are diagrams outlining the Finite Element Significant UP Force Vector Analysis, each UP vector represents a 5 degree solid angle of UP beams.
Figure 7:
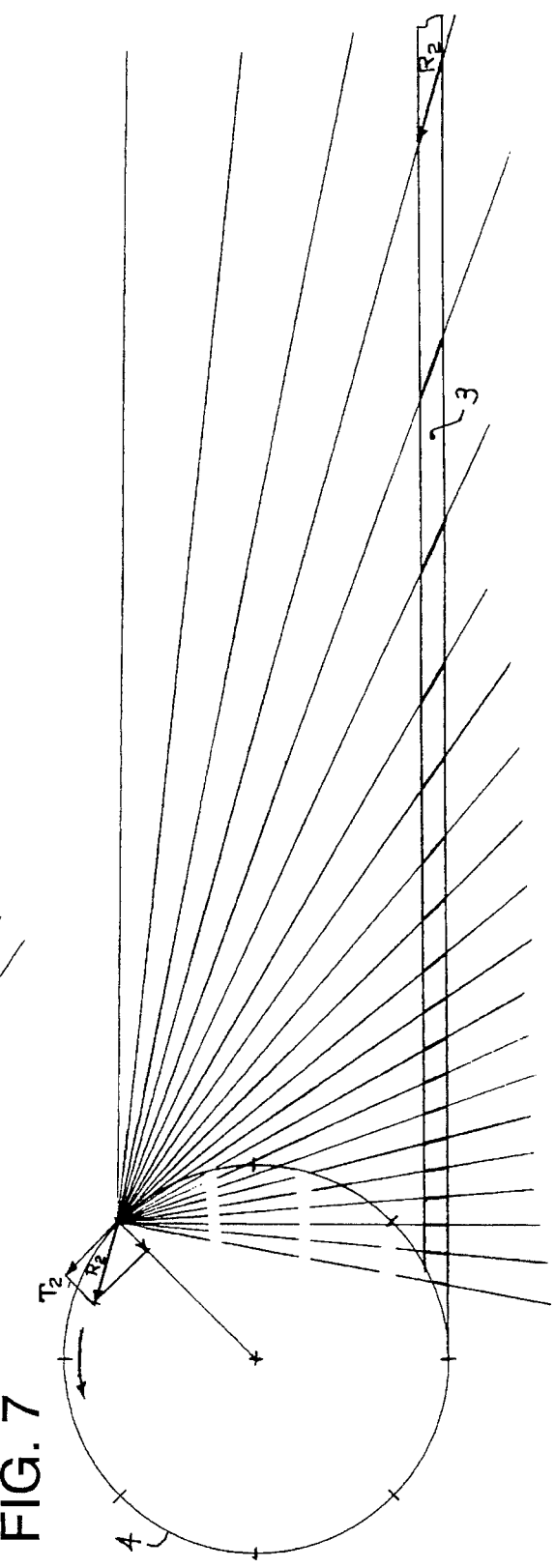
Figure 8:
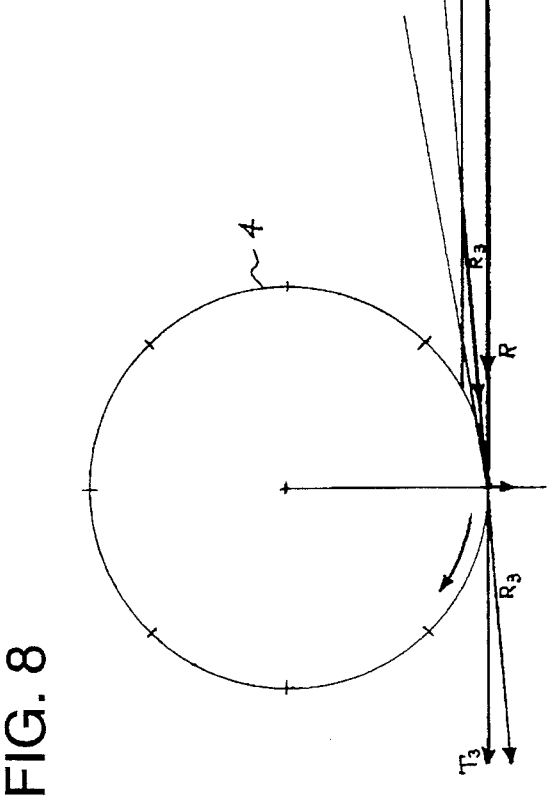

There are other vectors that add to, and others that oppose the rotation of rotor 1. Finite Element Analysis (FIGS. 6, 7, & 8) indicates that, the efficiency of the device improves as the rotor rim and the slot width is reduced, consistent with an increased length slot. The analysis was made for a slot length to rotor diameter ratio of 100 to 1, using 8 point masses on the rim, up to 21 UP beams to each rim-mass partially traversing the slot, and one UP beam totally within the slot. The rotor diameter, to slot width and rotor rim width ratio of 100 to 1 was used. The results clearly indicate that, under the above conditions, more forward torque is produced on the rotor by the summation of forces on the 8 rim "masses", than reverse torques. The UP vectors are longer on the lower semi circle, and they are generally closer to tangency, then on the upper semi circle, hence causing a forward torque on the rotor.

It appears that magnetic levitating bearings are suitable for the above force, on a 1 meter diameter rotor. The guide bearing should be in one plane only, so that the rotor is self aligning to the minimum potential energy position, and highly accurate balancing of the rotor is not required.

Probably the most cost effective method of building the "Shaded Rotor UP Pressure Integrator" device, is by using a piece of flat ground, for the shading mass, and digging out space for the rotor enclosure, and digging out the slot or slots. The rotor housing should be hermetically sealed, and it should have preferably, a clear top plate window 16.

Figure 9:
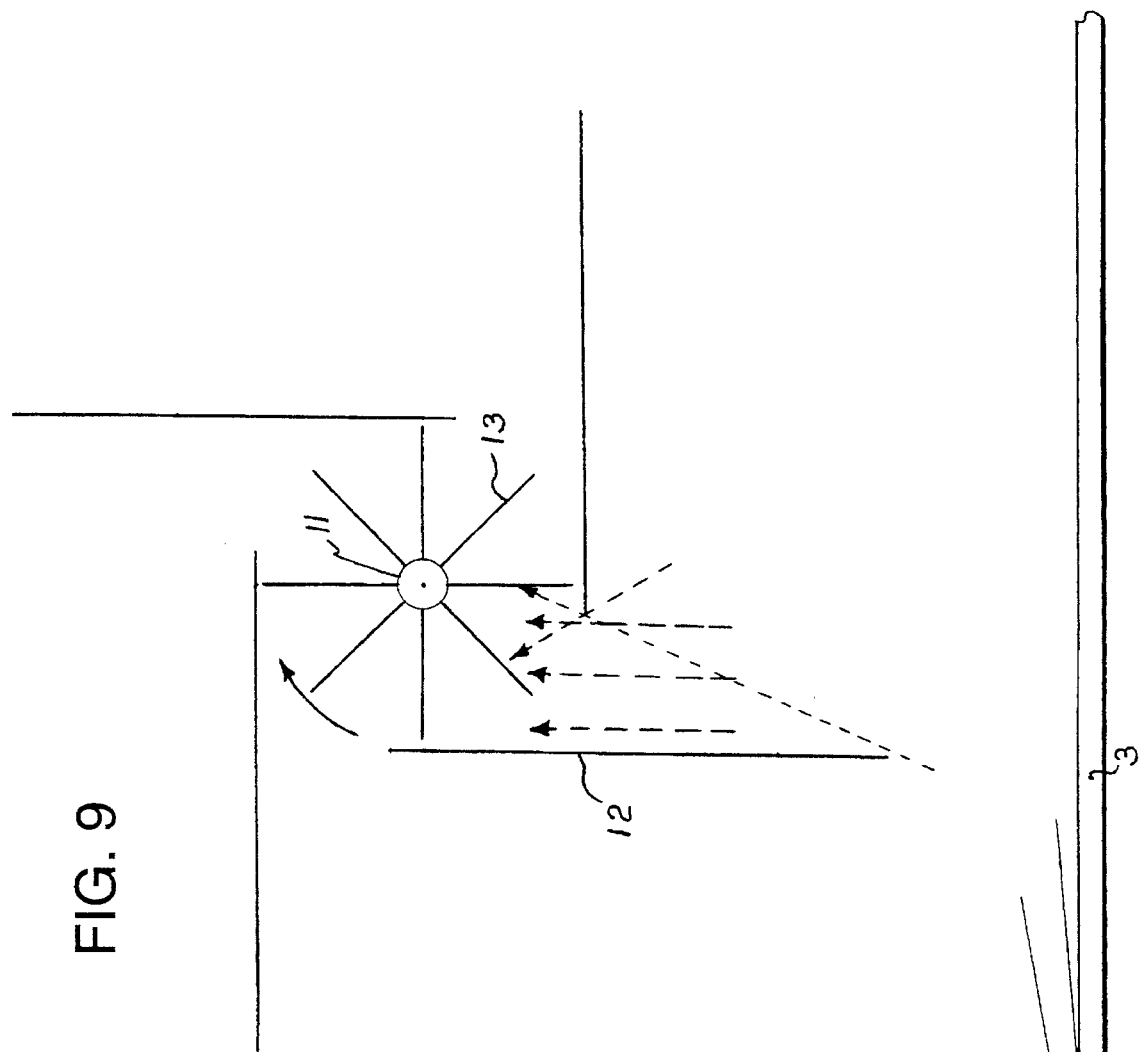
FIG. 9 is a schematic top view of a gas analogy Shaded Rotor device.

Referring now to the gas analogy, paddle wheel 11 in FIG. 9 with shades 12, is expected to rotate if the free mean path of the gas, is much longer than the spacing between paddles 13 and shades 12, respectively.

If total UP beam absorbing masses were available, for shade mass 2, and the UP Field exists as stipulated, rotor segment mass 9 would move away from slot 3, since the only unbalanced UP impact forces on the rotor would be through slot 3.

According to the "No Field" Theory, where masses are mysteriously attracting each other, point by point integration of forces without considering attenuation by intervening masses, for the "Shaded Rotor UP Pressure Integrator" configuration, no rotation should occur. The rotor is perfectly symmetrical to each element, so that no net forces are produced on the rotor. However, with absorbing intervening masses considered, there is a net force on the rotor.

The electrostatic force equation between two charges (in coulomb's), have the same form as the gravitational force equation between two masses (in kg's), however due to the magnitudes of the Universal Constants, the electrostatic forces are over 20 orders of magnitude larger than the gravitational forces!It is stipulated that as the UP beam traverses a mass with an excess of electrons or protons, the UP beam is attenuated significantly more than in the case of traversing a neutral mass. The attraction between unlike charges, and the repulsion between like charges have no simple explanations; we may be dealing with multiple species of UP's.

Forces between magnetic dipoles, have similarity to electrostatic forces, in that there is attraction and repulsion, and that their magnitudes per unit masses, are many orders of magnitudes larger than gravitational forces.

Inertial forces are probably caused by the UPF's interaction with the masses, but the precise form of interaction is yet to be discovered.

Bringing the UPF Theory down to Earth, the apparent "attraction" is caused by the unbalance of the UP beam vector components vertically up, attentuated slightly, by traversing the mass of the Earth. The UP vector components vertically down, are at full strength, un-attenuated by the Earth's mass. All horizontal force components are balanced. (Cosmic rays have been detected in tunnels under several miles of rock).

This hypothesis also implies that there is a maximum value of gravitation, or uni-directional (resultant) UP beam pressure, in the vicinity of masses so massive that no UP beams can traverse them, (the mass of a Black Hole).

Classical physicists are currently measuring "gravity waves" or "gravitons", emanating from the Universe, and are also measuring the absorption of these gravitons by intervening masses.

It is implied that if the mean free path of the UP's are measured in stellar distances, the non incandescent mass distribution of space, may be measured, within the free mean path of the UP's, by a single slot SRUPPI device.

It is also possible that the UPF's interaction with the atomic structure of matter, is holding matter from "flying" apart.

There is a major distinguishing factor in the behavior of the Shaded Rotor UP Pressure Integrator, between UPF operation and "individual element attraction" operation. As the mass free slot length L is increased, for the UPF hypothesis, the force on the rotor rim mass should increase, approaching linear increase for large L/Dia. ratios. As for the "individual mass element attraction hypothesis, rotor segment mass 9 should be moving toward slot 3, since the attenuation of mass attraction, due to intervening masses, is smallest at rotor segment mass 9, due to slot 3. As the slot length is increased, the net force on the rotor rim mass should asymptotically approach a constant.

It is stipulated that the Universal Particle Field may have been formed by the original "Big Bang" of the Universe, and it may still be expanding.

Figure 4:
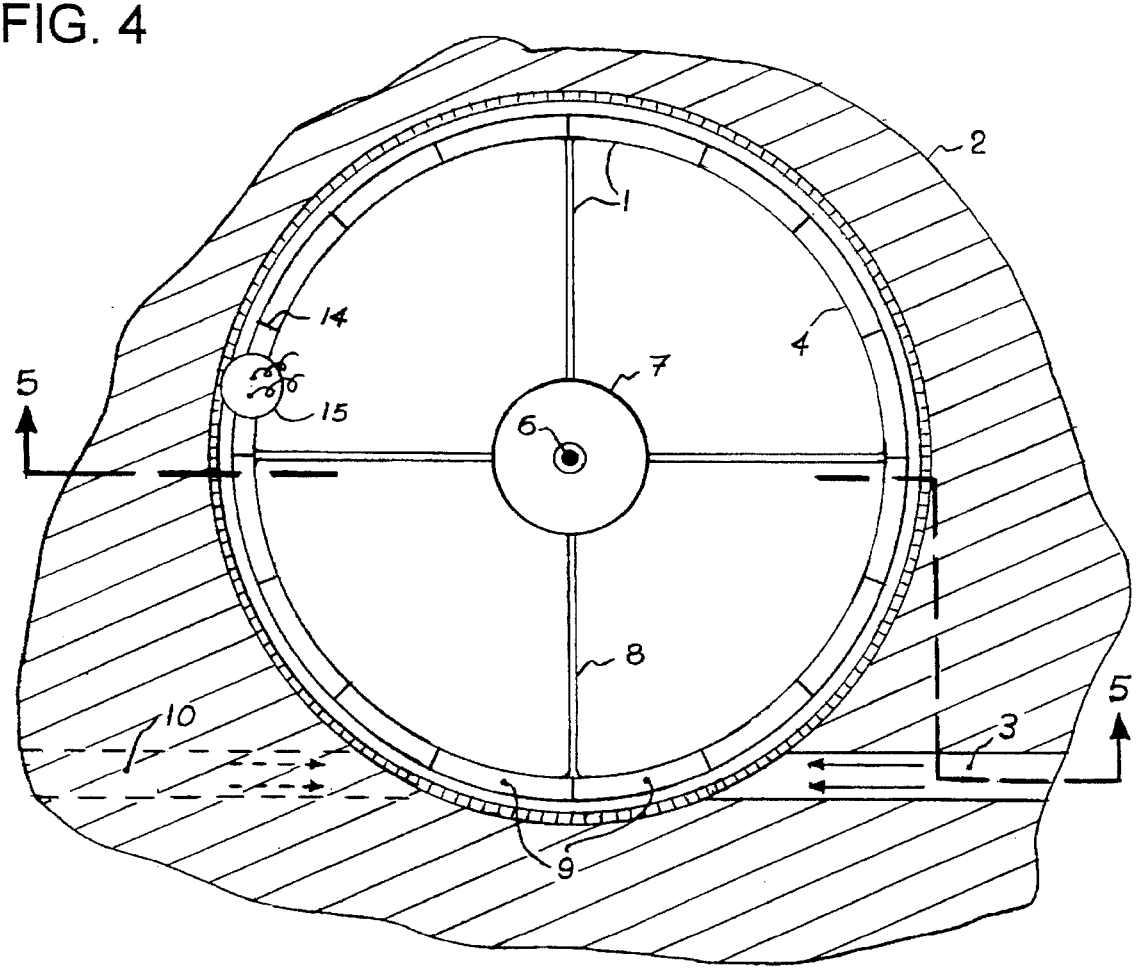
FIG. 4 is a schematic top view diagram of the Shaded Rotor Universal Particle Pressure Integrator (SRUPPI) device.
Figure 5:
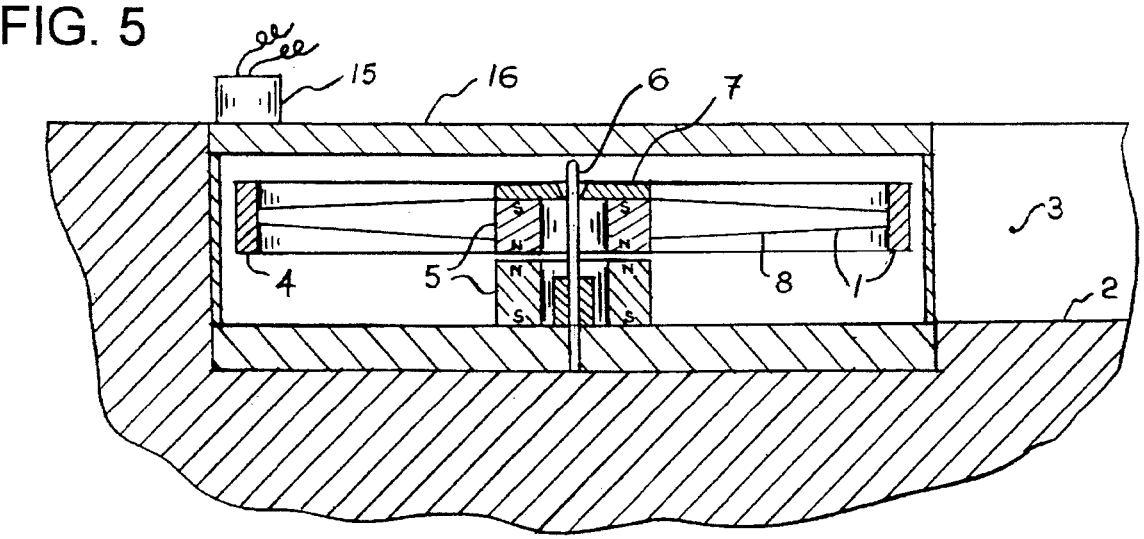
FIG. 5 is a cross sectional side elevational view of the Shaded Rotor Universal Particle Pressure Integrator (SRUPPI) device.

The direction of rotation of the rotor, for the UPF Theory, in FIG. 4, was set up such that the rotation of the Earth will add 1 revolution per day, to the rotation of the rotor, on the Northern hemisphere, (Coriolis Effect). The rotor contains optical rulings 14, and in conjunction with an optical/digital tachometer 15, the speed of the rotor is measured. The rotor should initially accelerate to a terminal speed, then maintain that speed, for a constant UPF.

The final conclusion is that, if a device like the "Shaded Rotor Universal Particle Pressure Integrator" has never been built, it should be built; and the UPF Theory should be proven or laid to rest, once and for all.

It should be appreciated by those skilled in the art, that this invention may take various embodiments other than the illustrative embodiment heretofore described. Accordingly, we intend by the following claims to cover all modifications within the spirit and scope of our invention.

What we claim is new, and desire to secure by Letters Patent of the United States is:

1. A device for detecting the hypothetical Universal Particle Field comprising:

a rotor, made of non-magnetic materials and hermetically sealed in a chamber, includes a massive rim enclosed within a Universal Particle shading mass which impedes Universal Particle beams;

said rotor is supported and mounted by low friction magnetic levitating bearings positioned within a plane so that said rotor is self-aligned to minimize potential energy position and the vertical axis of said rotor is held in position by a low friction bearing;

said shading mass having a mass free slot substantially aligned with said rim mass of said rotor so that said Universal Particle beams impinging and imparting a force of impact on said rotor rim mass are attenuated less through said mass free slot then 180 degrees from said slot hence a net force is produced on said rotor rim mass.

* * * * *